No. 673,837.  
J. T. HOUGH.  
GLASS ROLLING MACHINE.  
(Application filed Apr. 25, 1900.)  
Patented May 7, 1901.

(No Model.)  
2 Sheets—Sheet 1.

WITNESSES  
Thomas W. Bakewell

INVENTOR  
J. T. Hough

No. 673,837. Patented May 7, 1901.
J. T. HOUGH.
GLASS ROLLING MACHINE.
(Application filed Apr. 25, 1900.)
(No Model.) 2 Sheets—Sheet 2.
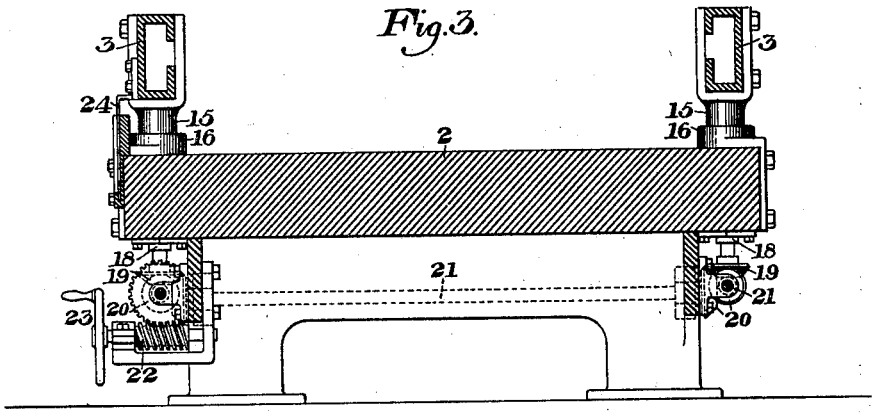
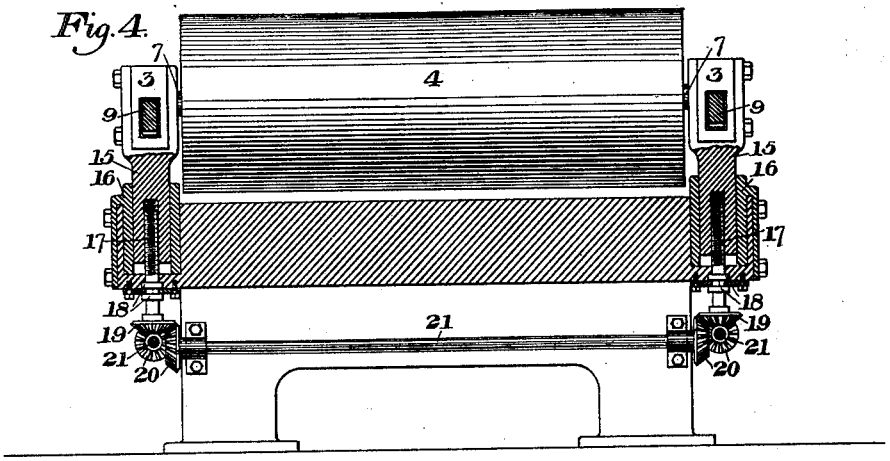
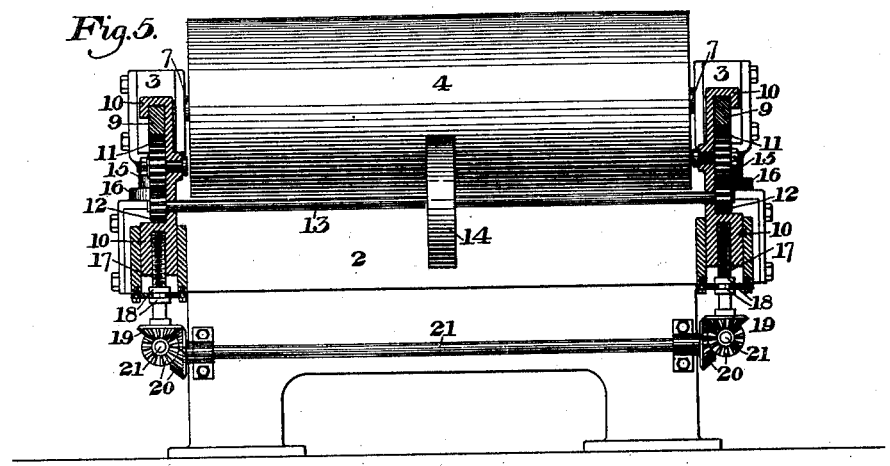
WITNESSES
Thomas W. Bakewell
INVENTOR
J. T. Hough

United States Patent Office.

JOHN T. HOUGH, OF PITTSBURG, PENNSYLVANIA, ASSIGNOR OF ONE-HALF TO JOHN A. HARPER, OF SAME PLACE.

GLASS-ROLLING MACHINE.

SPECIFICATION forming part of Letters Patent No. 673,837, dated May 7, 1901.

Application filed April 25, 1900. Serial No. 14,283. (No model.)

*To all whom it may concern:*

Be it known that I, JOHN T. HOUGH, of Pittsburg, in the county of Allegheny and State of Pennsylvania, have invented a new and useful Improvement in Glass-Rolling Machines, of which the following is a full, clear, and exact description, reference being had to the accompanying drawings, forming part of this specification, in which—

Figure 1:
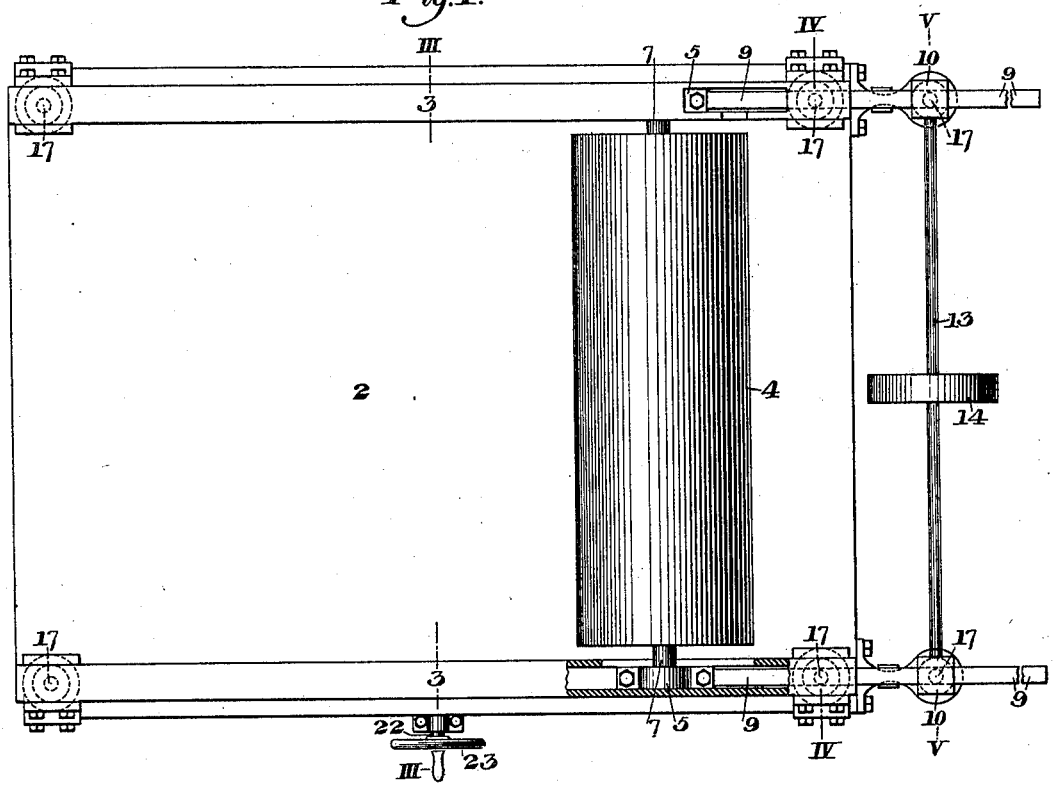
Figure 2:
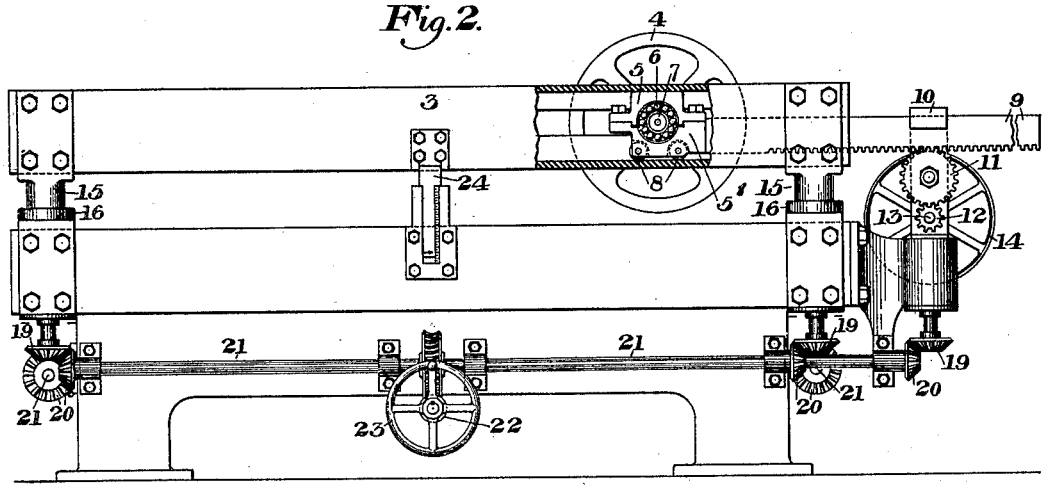

Figure 1 shows in top plan view a glass-rolling machine constructed in accordance with my invention. Fig. 2 is a side elevation thereof, partly in vertical section. Figs. 3, 4, and 5 are vertical cross-sections on the lines III III, IV IV, and V V, respectively, of Fig. 1.

In the drawings, 2 represents the table on which the glass is cast and rolled. It may be of any suitable construction, and may be heated in any convenient manner in order to bring it to the proper temperature for receiving the glass.

3 3 are parallel guide-rails at the sides of the table, adapted to guide and support the bearings of the roll 4. These bearings are preferably constituted by blocks 5 5', containing antifriction balls or rollers 6, within which the journals 7 of the roll are contained, and may be supported by antifriction-rollers 8, enabling them to be moved freely along the guideways. The lower blocks 5' are made integral with or fixed to rack-bars 9. These rack-bars have bearings at the upper end of standards 10 and mesh with pinions 11, driven by gear-wheels 12 on a shaft 13, which derives its power from a suitable driving wheel or pulley 14. When said shaft is driven, the rack-bars are moved longitudinally, the bearings of the roller are carried along the guide-rails 3, and the roll is moved over the table. The thickness of the sheet of glass is regulated by adjustment of the guide-rails 3 vertically, which determines the vertical distance between the roll and the surface of the table. This adjustment is effected with great precision by the following mechanism: The guide-rails 3 are supported by standards 15 15, which are adapted to slide vertically in the bearings 16 and are provided with adjusting screw-shafts 17. These screw-shafts are held rotatably to the table structure by collars 18, and are provided with bevel gear-wheels 19, which mesh with pinions 20 on shafts 21, and a like mechanism is provided for the standards 10, which carry the bearing of the rack-bars. All of these shafts are in gear with a worm-shaft 22, provided with a hand-wheel 23, by which it may be rotated, enabling the standards to be moved vertically to a uniform extent and the guide-rails 3 to be moved up or down with a parallel motion. A very accurate adjustment, within a small fraction of an inch, may thus be obtained.

The extent of the vertical adjustment may be determined by a gage comprising a graduated bar 24, fixed to one of the guide-rails 3, and this adjustment may be effected not only prior to the rolling of a glass sheet, but, if desired, during the rolling operation.

In the use of my invention a mass of molten glass is cast upon the table in front of the roller, and then by driving the shaft 13 the bearings of the roller can be moved along the guide-rails and the roller caused to travel over the table and to spread the glass out in the form of a sheet. As the roller moves along the guide-rails, and as these rails are held in preferably parallel position, a sheet of very uniform thickness is obtained, and the glass produced by reason of the movement of the bearings of the roller over the table will be of very smooth surface as compared with the product of rolling mechanism heretofore used, in which the roller is traversed by power applied to its periphery by hand or chains or otherwise and without any guides.

The mechanism is such that the roller will give uniform pressure to the glass whether it be moved rapidly or slowly.

Within the scope of my invention as defined in the claims changes in the form and construction of the parts may be made by the skilled mechanic, since

What I claim is—

1. Glass-rolling apparatus comprising a table, a roll having bearings mounted on guides extending parallel with the table along substantially the entire working face of the table, said bearings being movable along the guide and adapted to carry the roll over the table to roll the glass thereon; substantially as described.

2. Glass-rolling apparatus comprising a roll having bearings mounted on horizontal bearings and secured to bars, and means for moving said bars in parallel position; substantially as described.

3. Glass-rolling apparatus comprising a roll having bearings mounted on guides, rack-bars secured to the bearings, and gearing by which the rack-bars may be moved; substantially as described.

4. Glass-rolling apparatus comprising a table, guides extending along substantially the entire working face of the table, roll-bearings mounted thereon, and vertically-adjustable standards for the guides; substantially as described.

5. Glass-rolling apparatus comprising guides, a roll having sliding bearings mounted thereon, bars by which the bearings are moved, standards for the guides and for the bars, and adjusting mechanism by which the standards may be adjusted; substantially as described.

6. Glass-rolling apparatus comprising guides, a roll having sliding bearings mounted thereon, bars by which the bearings are moved, standards for the guides and for the bars, and adjusting mechanism by which the standards may be adjusted, said adjusting mechanism comprising adjusting-screws and gearing by which the several screws are connected; substantially as described.

In testimony whereof I have hereunto set my hand.

J. T. HOUGH.

Witnesses:
THOMAS W. BAKEWELL,
J. A. HARPER.